United States Patent

[11] 3,598,917

[72] Inventors Egide Jacob Hendrik De Raedt
Hoboken;
George Pieter Adolf Mathildis De Bruyne,
Lebbeke, both of, Belgium

[21] Appl. No. 689,899
[22] Filed Dec. 12, 1967
[45] Patented Aug. 10, 1971
[73] Assignee International Standard Electric Corporation
[32] Priority Dec. 12, 1966
[33] Netherlands
[31] 6617451

[54] AUTOMATIC SIGNAL TRANSMISSION SYSTEM

14 Claims, 6 Drawing Figs.

[52] U.S. Cl. ........ 179/5 R
[51] Int. Cl. ........ H04m 11/04
[50] Field of Search ........ 179/5, 5 P, 16 A, 16 AA, 84 VF

[56] References Cited

UNITED STATES PATENTS

| | | | |
|---|---|---|---|
| 2,911,474 | 11/1959 | Weinberg | 179/5 R |
| 3,484,553 | 12/1969 | Lovell | 179/5 R |
| 3,492,426 | 1/1970 | Foreman | 179/5 R |
| 3,401,234 | 9/1968 | Heald | 179/5 |

*Primary Examiner*—Ralph D. Blakeslee
*Attorneys*—Cornell Remsen, Jr., Rayson P. Morris, Percy P. Lantzy, J. Warren Whitesel, Phillip A. Weiss and Delbert P. Warner

ABSTRACT: An alarm system is provided to operate over the existing public telephone network. An AC oscillator at each substation provides a continuous signal which is separated in frequency and by filter from any voice signals. Disconnection of the continuous signal will supply an alarm and cause equipment in the central office to connect to an operator, a police station or a fire station. Suitable central office equipment can identify the source of the alarm signal and provide an indication to the called station.

Figure 1:
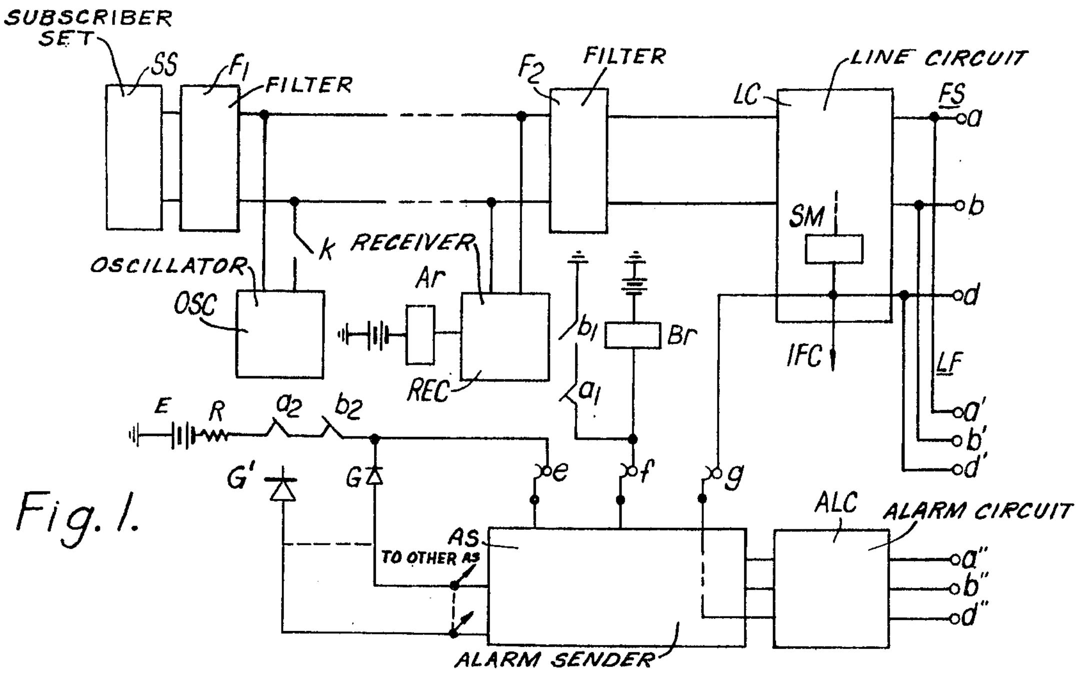

E. De Raedt
G. De Bruyne
Inventors

By O. J. Warner
Attorney

AUTOMATIC SIGNAL TRANSMISSION SYSTEM

The invention relates to an automatic signal transmission system to interconnect distant stations through at least one central exchange and including means to generate station selection signals as well as means to transmit special signals from a station to an exchange.

Such a system is known from the U.S. Pat. No. 3,120,579 disclosing a telephone alarm reporting system in which, as a result of an alarm signal being transmitted from a telephone substation to the telephone exchange, the telephone line is directly connected to an alarm operator's position. A system of this kind offers the advantage that little alarm apparatus is required at the subscriber's location, most of the equipment being centralized at the telephone exchange. This is particularly significant since while alarm systems can be most useful, for example in connection with fires or burglaries, usually such equipment when used at the subscriber's premises is relatively bulky, complex and accordingly price and maintenance may present problems. A centralized system using the telephone network and enabling the use of a minimum amount of equipment at the subscriber's location is thus very desirable since it may substantially reduce the cost of such an alarm service, simplify maintenance and make it available on a wide scale.

In the telephone alarm reporting system of the U.S. Pat. No. 3,120,579 mentioned above, a quiescent DC current normally flows through the loop and upon an alarm being originated, this reduced loop current is completely interrupted resulting in the release of an alarm detector associated with the line circuit at the exchange and this branches a low resistance circuit between the speech conductors at the exchange, this resulting in the operation of the normal line relay just as if the subscriber's loop had been closed. Since this action will not be followed by a dialling operation it corresponds to a false call or permanent signal condition which normally causes a timing-out operation so that after an interval of time from 20 to 40 seconds, such permanent signals are routed to a permanent signal holding trunk circuit for subsequent action leading to ultimate clearing of the condition. In the case of the alarm detector having first reacted to the opening of the loop, the timeout circuit will now be modified so that after a reduced interval of from 5 to 10 seconds the alarm permanent signal will this time be routed to an alarm operator's position.

While this known system, necessitating the presence of an operator in the exchange to which the subscriber is connected, generally avoids interference between alarm operations and the normal operation of the telephone facilities, the alarm line circuit adapter is so designed that upon the cutoff relay being operated, it will hold the alarm detector relay operated. Since this alarm relay is normally operated by the quiescent DC current in the manner explained and since an incoming telephone call to the telephone substation equipped with such alarm facilities will lead to the operation of the cutoff relay in the subscriber's line circuit, this means that by calling this telephone substation the alarm facilities will be blocked as the alarm detector relay cannot release to initiate the connection of the line to the alarm operator's position.

Another possible limitation of the known system is that it is based upon the use of a leakage DC current through the subscriber's loop by using a resistance of relatively high value such as 40 kilo-ohms at the subscriber's station. Indeed, telephone administrations may specify somewhat lower resistance values as minimum admissible leakage resistances between the speech conductors and obviously severe marginal conditions might be created since the alarm resistance should be larger and clearly distinct from the maximum allowable impedance of a telephone line in the closed loop condition while at the same time it should be lower and clearly distinct from the minimum leakage resistance allowable between the speech conductors.

A general object of the invention is to realize a new and improved automatic signal detection system which may particularly serve for a centralized alarm system over telephone lines and which enables the immediate selection of any desired called station corresponding to the origin and/or nature of the alarm signal without any mutual interferences between alarm and telephone connections.

In accordance with a first characteristic of the invention, an automatic signal transmission system as initially defined is characterized by the fact that automatic selection signal generating means are provided in the exchange and are made operative upon receipt of the special signals from the station.

In accordance with another characteristic of the invention, said automatic selection signal generating means are provided in common for a plurality of stations.

In accordance with a further characteristic of the invention, automatic identification means are provided in said exchange to identify a telephone station having issued the special signals and to transmit said identity to the called station.

In accordance with yet a further characteristic of the invention, AC signal generating means are located at the station to provide said special signals and AC signal receiving means are provided at the exchange to receive said special signals and thereby cause said automatic selection signal generating means to become operative in said exchange.

Thus, in brief, a particular realization of the invention could include an oscillator at the subscriber's premises to be protected and this would normally send a signal across the line to the exchange where it would normally operate a relay. Upon an alarm condition interrupting this transmission, the release of the relay may start a special finder to hunt for the adapted line circuit of the subscriber and when positioned thereon, the circuit of the special finder including an automatic dialling device may originate an alarm call to any desired number such as a special police or fire brigade number. The dialling of such a special number will automatically lead to the identification of the calling line circuit which identification can be displayed at the called station.

In this manner, all the alarm calls may be centralized at any desirable location and any predetermined called station, not necessarily in the same exchange, may be reached when an alarm condition is generated. Constant supervision of the substation is possible without encountering any limitations due to leakage current problems and there are no interferences between alarm calls and ordinary telephone calls, the latter being unable to block an alarm operation.

Figures 2, 6:
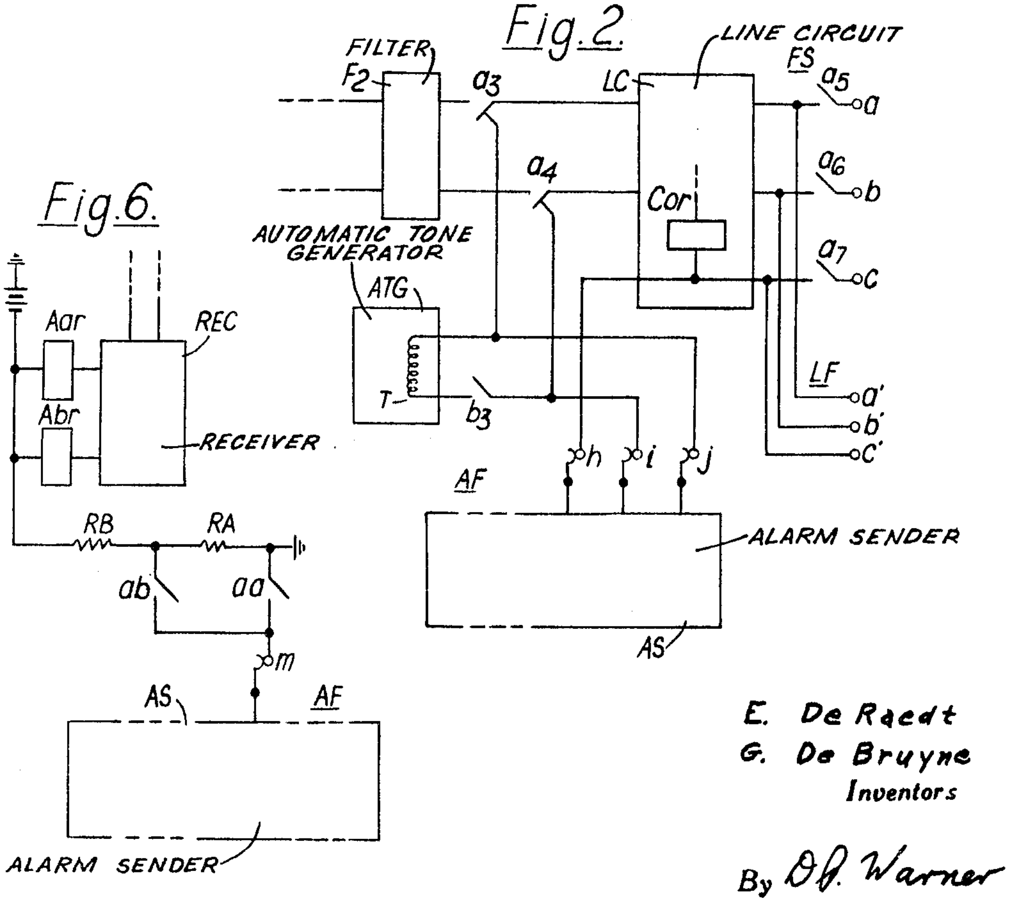
Figure 3:
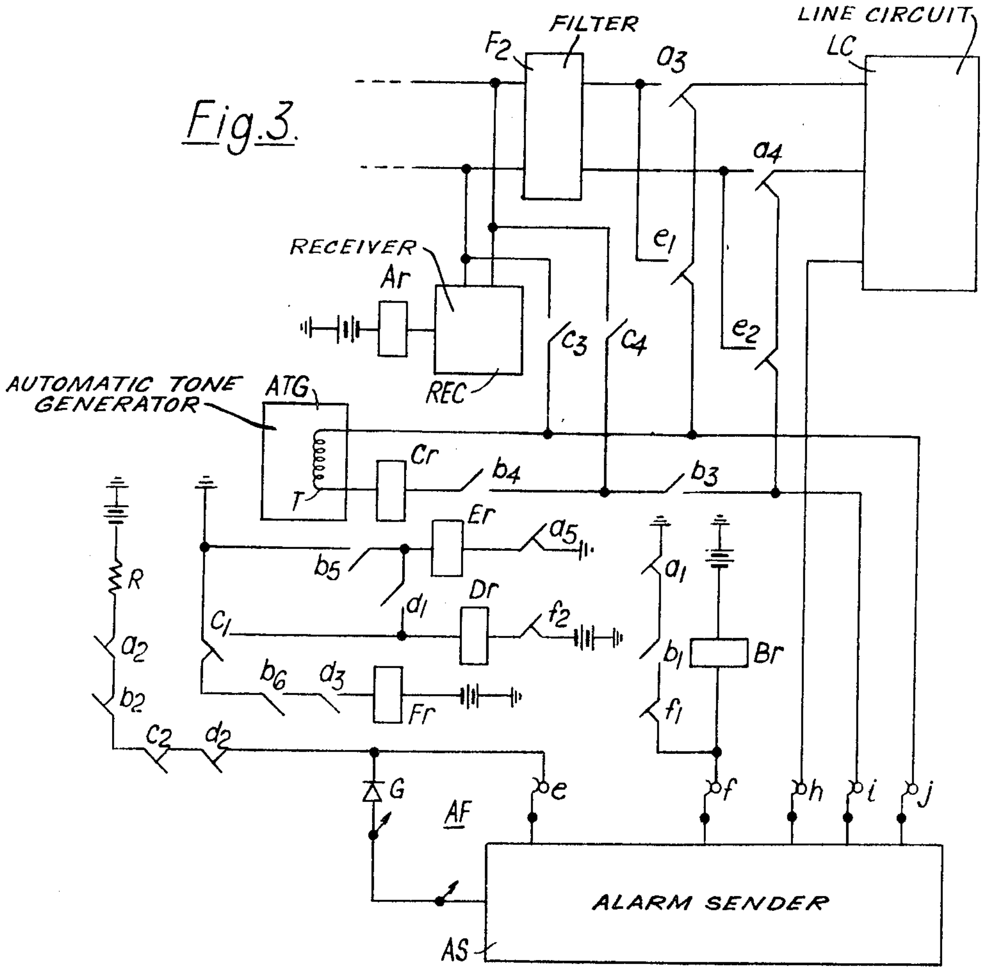
Figure 4:
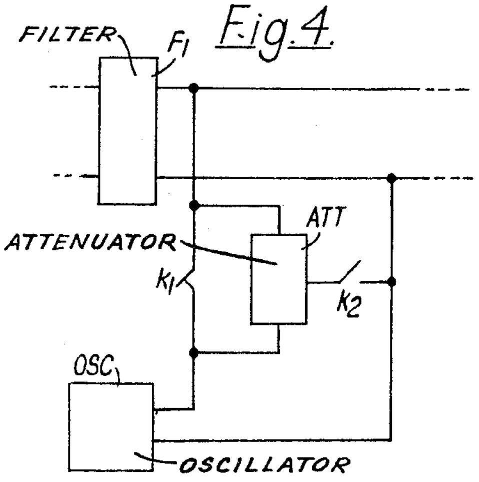
Figure 5:
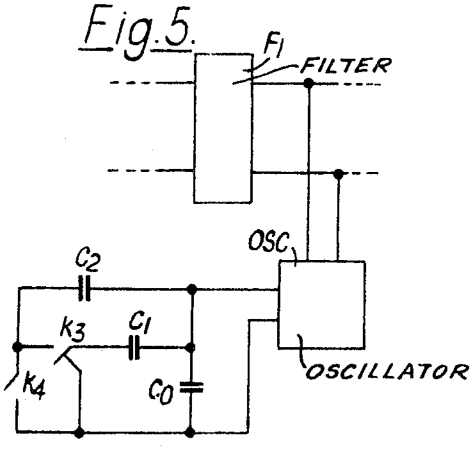

The above and other objects and characteristics of the invention as well as the best manner of attaining them and the invention itself will be better understood from the following detailed description of embodiments thereof to be read in conjunction with the accompanying drawings which represent:

FIG. 1, a first embodiment of the invention using a special alarm line circuit;

FIG. 2, a modification of FIG. 1 illustrating a second embodiment of the invention in which a special alarm line circuit is avoided;

FIG. 3, a modification of FIG. 2 ensuring a positive check that the alarm has been acted upon at the called station;

FIG. 4, a modification of the alarm signalling means used at the substation of FIG. 1;

FIG. 5, a further modification of the alarm generating means at the substation of FIG. 1; and FIG. 6, a modification of the alarm signal receiver of FIG. 1.

FIG. 1, representing a first version of a centralized telephone alarm reporting system, shows that very little additional equipment is necessary at the subscriber's premises, since apart from the conventional telephone subset SS only a filter $F_1$ and an oscillator OSC are required in addition to the alarm contacts one of which *k* has been represented. The oscillator OSC will preferably emit a tone outside the voice frequency range, for instance above this range, but this is not essential since although it is normally branched across the telephone line conductors when contact *k* is closed, it is separated from the telephone subset SS by the filter $F_1$ admitting speech frequencies but rejecting the alarm tone. As the oscillator is shown to be placed in parallel on the filter output, the filter output impedance should normally be high at the oscillator frequency. Normally, the alarm contact *k* is closed and it is only when an alarm condition arises that the connection between the oscillator OSC and the telephone line will be interrupted as shown.

At the telephone exchange, the line conductors are connected to the ordinary telephone line circuit LC through another filter $F_2$ which may be of the same design as $F_1$ since a receiver REC is branched across its input on the side of the telephone line. Normally the received AC signal is detected in REC and leads to the operation of an alarm relay A*r* connected between negative battery and an output of this receiver.

The described alarm supervision system thus does not interfere in any way with ordinary telephone calls but upon an alarm condition being originated at the subscriber's premises or also upon the line conductors being cut or short-circuited, the absence of the AC signal at the receiver REC, e.g. due to the opening of alarm contact *k* as shown, will lead to the release of relay A*r* which is the condition shown in FIG. 1.

Upon release of the A*r* relay, its break contact $a_2$, which was previously open, closes. Due to the closure of break contact $a_2$ negative battery will be applied through resistance R, contacts $a_2$, $b_2$ and a suitable decoupling impedance, shown here as a rectifier G, as a starting signal to initiate alarm operations at the exchange. The rectifier G is connected to the alarm sender circuit AS, as shown. The same alarm sender circuit may serve a plurality of subscriber lines by multiplying the respective alarm adapter circuits to the sender circuit AS through corresponding rectifiers G–G', in a generally known manner. Additional alarm sender circuits may be multipled to the alarm adapter circuits in a well known manner as shown by the multipling arrows at the left side of the alarm sender circuit AS in FIG. 1. In the smaller exchanges, duplication of the latter will generally be desirable at least from a reliability and maintenance viewpoint in that when one unit fails a duplicate unit will take over and perform the sender function.

The alarm circuit AS is coupled to an alarm finder AF through a suitable switching means such as rotary switches on crossbar switches that enable the starting of this finder from any rest position in order to reach the calling line circuit equipped with an alarm adapter circuit. Such a finder AF (only some of its wipers are shown) will thus start its motion upon negative battery being applied through the decoupling rectifier G to circuit AS and upon the finder brush meeting the terminal *c* of the alarm adapter circuit that has originated an alarm call. The alarm finder AF will detect the negative DC potential E coupled thereto through resistance R and the closed contacts $a_2$ and $b_2$ in series. The DC potential may cause the finder to stop on the alarm adapter circuit by conventional means (not shown). In the same way, such means included in circuit AS will now place the DC potential E on test terminal *e* that the latter connected to the cathode of rectifier G, may then cause rectifier G to be blocked thereby preventing the start condition from actuating other alarm sender circuits.

The alarm sender circuit AS now positioned on the calling alarm adapter circuit by means of its finder AF may then take care of automatically issuing a call to a predetermined telephone substation able to deal with the detected alarm condition, e.g. a police station, a fire brigade or a national emergency help number such as N. 900 in the Belgian telephone network. This may readily be achieved by providing circuit AS with repertory dialling facilities (not shown) which may for instance be constituted by relay circuitry of the type disclosed in the U.S. Pat. No. 2,919,310. Such automatic repertory dialling means will simulate an ordinary call with the help of an alarm line circuit ALC to which the alarm sender circuit AS is connected and may be equipped with automatic dial tone detectors, this being a solution preferable to timing means which assume that the dial tone will appear after a maximum predetermined delay. This alarm line circuit ALC may be similar to the generally known line circuit LC which may include a line relay as well as a cutoff relay such as that shown in the U.S. Pat. No. 2,609,454. Such a line circuit being conventional in a general way, again the details of ALC are not represented in FIG. 1. Alarm line circuit ALC may however be simplified since this line circuit need only be used to originate calls. In fact, it is not desirable that this alarm line circuit ALC could be called from another telephone substation since this might block an urgent alarm call. For this reason, the three outside terminals *a''*, *b''* and *d''* shown connected to ALC are terminals in the arcs of line finders LF (not shown) only, so that final selectors FS (not shown) do not have access to alarm line circuit ALC. The automatic call originated by circuit AS will thus lead to a connection to the desired called party, e.g. the fire brigade characterized by No. 900 on a national basis, through a train of finders and selectors in the usual way. The automatic repertory dialling facilities in circuit AS may be provided with a ringing tone detector so that the answer of an operator at position No. 900 can be detected.

In addition to the terminals *a''* and *b''* for the speech wires, one test terminal *d''* in the arc of the line finders has also been shown. As shown for the normal line circuit LC, the corresponding *d* conductor is that to which the subscriber's meter or message register SM is connected in the line circuit LC. To permit metering of the alarm call, and moreover identification thereof, the line finder terminals such as *d* corresponding to the alarm line circuit such as ALC are connected through a wiper of the special finder AF to terminal *g* leading, through the ordinary line circuit LC, to the line finder terminals such as *d'* corresponding to such a circuit, as well as to terminal *d* in the arcs of the final selectors FS. This means that upon a line finder LF (not shown) being positioned on a calling alarm line circuit ALC, through conductors (not shown) leading to terminal *d''* access can be had to the subscriber's meter SM. This same conductor can be used for identification of the calling line by sending thereon, from the identifying exchange, a 20 kc./s. identification tone which will thus appear on terminal *d''* and through terminal *g* will reach the subscriber's meter SM. From there, in the manner disclosed for instance in the U.S. Pat. No. 2,954,439 issued on Sept. 27, 1960 this tone will be sent via three capacitors to detecting points corresponding to the hundreds, tens and units digits of the subscriber's line and this will permit identification of the calling line. This identification equipment being classical is not shown but merely indicated by the arrow identified by IFC. For a general review of line identification equipment, a reference may be made to the Bell System Technical Journal, July 1951, pages 518—625. Such identification facilities are normally provided throughout the Belgian network and may be used not only to charge all trunk calls but also by such special services as the fire brigade characterized by the NO. 900. Thus, receipt of this number in the register controlling the establishment of the communication is sufficient to indicate that the call must be identified and display equipment is provided at the corresponding operator's position so that the identity once obtained can be forwarded thereat.

It should be noted here that should the automatic repertory dialling facilities in AS issue any other predetermined number which should be called when an alarm arises at certain subscribers' premises, irrespective of this number being reached over a trunk or a local connection, it will always be possible to identify the calling line where the alarm has occurred and display the identity at the called telephone substation by using identification arrangement of the type disclosed in the U.S. Pat. application Ser. No. 958,370, filed on Dec. 21, 1966, and assigned to the present assignee.

As soon as the alarm sender circuit AS has detected an answering of its alarm call, it can automatically connect a battery potential (not shown) to the wiper of special finder AF corresponding to terminal *f* in order to cause the operation of relay B*r* in the line circuit adapter. This relay operates and locks to ground through its make contact $b_1$ in series with the closed contact $a_1$ of the alarm relay A*r* now in the released condition, since the alarm contact *k* is in the open condition. Thus, ground will appear at terminal *f* and may indicate to circuit AS that it is no longer required in connection with this particular alarm call and may now be released in readiness for answering further alarm calls. In the line circuit adapter, relay B*r* will remain locked until the alarm is cleared by someone such as a fireman, a subscriber or a policeman. This would lead to the reclosure of contact *k* at the subscriber premises, and cause the reoperation of A*r* and the subsequent release of B*r*.

Before causing the operation of B*r*, alarm sender circuit AS can forward an alarm tone to the called party through terminals *a''* and *b''*, or in fact any prerecorded message that might be desirable. In order to ascertain that the alarm call has effectively reached its destination, and is being properly identified, since the identification tone of 20 kc./s. passes through circuit AS to reach terminal *g*, circuit AS may be provided with a detector (not shown) adapted to verify the arrival of this tone so that release of circuit AS will only take place after such a check. In such a case any suitable means, such as a unidirectional amplifier in AS or a make contact of A*r* in the *d* conductor connection between SM and *d'*, may be used to ensure that the 20 kc./s. detector reacts only to an identification tone coming from *d''* and not from *d'* in case a normal telephone call from SS is being simultaneously identified. If such answering and identification controls are unsatisfactory, a renewed attempt to establish the connection, preferably with another AS circuit, may be carried out and this can be repeated any desired number of times. In this connection, in an attended exchange a lamp (not shown) may be associated with relay A*r* in order to be lit upon release of this relay indicating an alarm condition while another lamp may be associated with relay B*r* and be lit upon energization of this second relay. Thus the second lamp being lit would indicate that the alarm is being taken care of. Also, while a permanent association has been shown between the circuit AS and the alarm line circuit ALC, switching means may be provided there between in order that the alarm sender circuit may select a free specialized alarm line circuit to transmit the call.

FIG. 2 shows an alternative realization in which an alarm line circuit such as ALC in FIG. 1 is no longer necessary. Only those parts of FIG. 1 which are necessary to understand the modifications are represented in FIG. 2. As shown, there is no longer a direct interconnection through the speech wires between filter $F_2$ in the exchange and the line circuit LC. This is now made through make contacts $a_3$ and $a_4$ of the alarm relay A*r*. Since this relay releases as soon as there is an alarm, as shown in FIG. 2, these contacts will now be in their break positions and interrupt the connection between the subscriber set SS and its line circuit LC at the exchange. Instead, the latter will be connected to terminals *i* and *j* in the arcs of the special finders such as AF so that through corresponding wipers positioned on these terminals *i* and *j*, the automatic repertory dialling facilities provided in AS may be used to originate an alarm call through the normal line circuit LC of the subscriber' s line. Hence, in the normal manner, a line finder LF may be positioned on such terminals as *a'*, *b'* and *c'* and a connection established to a desired called line in the manner previously explained.

With the arrangement of FIG. 2 if the telephone substation where the alarm has occurred has originated a telephone call, the release of relay A*r* will immediately interrupt such a connection and the alarm sender circuit AS upon being positioned on the line circuit adapter may readily verify the release of the line circuit LC by checking the condition of the normal cutoff relay C*or* which is represented as connected to terminals h in the arcs of the special finders such as AF. Immediately after such a control, the automatic repertory dialling facilities may then send the selection signals.

In some telephone systems, backward release facilities imply that if the telephone subset where the alarm originated was being called, there would be a certain delay after the release of relay A*r* before the line circuit LC would again be in the released condition enabling the alarm call to be established. In unidirectional systems where different types of switches are provided to reach the subscribers' line circuits depending on whether the line is calling or is being called, it is possible to avoid such a delay before issuing the alarm call by interrupting upon release of relay A*r* the connections between the line circuit conductors and the terminals in the final selector arcs. FIG. 2 thus shows the make contacts such as $a_5$, $a_6$ and $a_7$ between the line circuit LC and the terminals a, b and c in the final selectors FS arcs, the last terminal corresponding to the test conductor to which cutoff relay C*or* is connected.

FIG. 2 also shows that the alarm tone generator ATG may be located in the line circuit adapter instead of in the alarm sender circuit AS so that upon operation of relay B*r*, closure of make contact $b_3$ will establish a DC loop through the output winding of transformer T in the tone generator ATG and in this manner after release of AF an alarm tone can still be forwarded to the called line, or in fact any desired prerecorded and predetermined message.

By their nature, alarm circuits must not only operate quickly and efficiently but also in as foolproof manner as is possible. In order to be absolutely sure that a call destined to the fire brigade for instance has reached its destination and is being taken care of, a further modification of the line circuit adapter of FIG. 1 is represented in FIG. 3. This is again of the general type disclosed in the modification of FIG. 2 wherein the ordinary line circuit LC is used for alarm calls. Therefore, only the circuits distinct from or additional to those of FIG. 2 are shown in FIG. 3 and the description thereof will also be limited to the new features.

If an alarm occurs, again the release of relay A*r* will give a starting signal, through break contacts $a_2$ and $b_2$ in series, which will reach at least one alarm sender circuit AS this time through additional series break contacts $c_2$ and $d_2$ of additional relays C*r* and D*r*. Return of the contacts $a_3$ and $a_4$ to the break position shown will, as in FIG. 2, connect the speech wires of line circuit LC to terminals *i* and *j* in the arcs of the alarm finder AF, but this time through additional contacts $e_1$ and $e_2$, in their shown break position, of yet a further relay E*r* in the line circuit adapter.

Upon the alarm sender circuit AS having accomplished its mission and, eventually, detected the answer of the called party or also the sending of an identification tone to the calling party which can take place with the help of terminals such as *g* (FIG. 1) and a corresponding wiper on the alarm finder AF, it will again apply ground potential to the terminal *f*, on which one of its wipers is connected, to cause the energization of relay B*r*. This relay will operate and again be locked through its make contact $b_1$ in series with break contact $a_1$ and also in series with break contact $f_1$ of a further relay F*r*. Also, opening of break contact $b_2$ will further open the alarm starting circuit to prevent an alarm finder AF from being again positioned on the line circuit adapter concerned.

Further, closure of the make contacts $b_3$ and $b_4$ will substitute for the calling loop provided in circuit AS through terminal *i* and *j*, one through the output winding of transformer T in the alarm tone generator ATG. A relay C*r* may have its winding inserted in this new loop connection in series with the winding of transformer T so that through contacts $e_{1/2}$ and $a_{3/4}$ the circulating loop current may cause the operation of this relay C*r*. A first result of this will be the establishment of an operating circuit for relay D*r* through make contact [illegible] and break contact $f_2$. A second result will be the further interruption of the alarm starting circuit at contact $c_2$. Moreover, closure of make contacts $c_3$ and $c_1$ will now lead to the input of the receiver REC being branched on the speech conductors towards the called line, the filter $F_2$ being bypassed. In operating, relay D*r* locks to ground through make contact $d_1$ in series with the winding of yet a further relay E*r* and break contact $a_5$. Relay E*r* cannot operate being short-circuited by make contact $b_5$ as well as by make contacts $c_1$ and $d_1$ in series. The alarm starting circuit is further interrupted at break contact $d_2$.

Since the receiver REC is now coupled to the called line, a positive acknowledgement signal in the form of a tone having the same frequency as that normally generated by the oscillator OSC in FIG. 1 may be sent from the called substation. Thus, upon the party thereat being satisfied that the alarm call is properly identified, or upon automatic means having checked this, this alarm check tone may be sent on the speech wires and it will reach receiver REC through such contacts as $a_{3/4}$, $e_{1/2}$, $b_3$ and $c_{3/4}$ causing the reoperation of alarm supervision relay Ar. Care may be taken to avoid diversion of alarm check tone energy to ATG by suitable frequency filtering therein. At break contact $a_1$, this will interrupt the locking circuit for relay Br which releases. At break contacts $a_3$ and $a_4$ the flow of alarm check tone will be interrupted so that the operation of Ar will only be momentary. Make contacts $b_3$ and $b_4$ also open so that relay Cr can no longer receive energizing current and releases. Opening of make contact $c_3$ and $c_4$ will further interrupt the flow of energy to receiver REC already interrupted at make contact $b_3$ so that relay Ar is definitely released after only a temporary operation sufficient to release Br. Thus, upon opening of make contacts $c_1$ and $b_5$ there is an operating path established for relay Dr in series with relay Er and through make contact $d_1$ and break contacts $a_5$ and $f_2$. Relay Dr is now locked in series with relay Er which operates also in that circuit. This means that though break contacts $b_2$ and $c_2$ have again been closed, the alarm starting circuit cannot be made operative because break contact $d_2$ remains open. Contacts $e_{1/2}$ of relay Er move from their shown break positions to their make positions and in this manner a connection is again established between the filter $F_2$ and the line circuit LC.

This means that the operation of relay Er is a positive indication that the alarm is being taken care of and moreover as soon as this is automatically ascertained the normal telephone connection is reestablished which is a highly desirable feature once the alarm is identified. An indicating lamp (not shown) may also be associated with relay Er and will be lit when the latter is operated to indicate that the alarm is being positively taken care of. Both relays Dr and Er remain operated until the alarm condition is cleared by the reclosure of contact $k$ (FIG. 1) leading to the operation of relay Ar which by opening its break contact $a_5$ will release both Dr and Er.

Assuming now that relay Ar fails to operate momentarily while relay Cr is energized, then, when the latter relay releases and this might occur due to the interruption of the connection or due to some forced release caused by a timing arrangement, relay Dr remains locked through make contacts $d_1$ and $b_5$ since relay Br has not released, and accordingly relay Er is still short-circuited and cannot operate. However, since both Br and Dr are operated when Cr releases, an operating circuit is now established for relay Fr through break contact $c_1$ in series with make contacts $b_6$ and $d_3$. Upon relay Fr operating, break contacts $f_1$ and $f_2$ open so that both Br and Dr release entailing in turn the release of Fr. The release of relays Br and Dr means that the alarm starting circuit is again closed through break contacts $a_2$, $b_2$, $c_2$ and $d_2$ in series and a new alarm call operation will thus be initiated.

FIG. 4 represents a modification of the connection of the oscillator OSC at the telephone substation (FIG. 1). As disclosed so far, the arrangement is such that upon the contact such as $k$ being opened, the supervisory alarm frequency will no longer be present on the line and this will initiate the alarm call. This means that if the line is open or short-circuited, the result will be the same as that following the opening of contact $k$. This is an additional safeguarding feature since cutting the telephone line will thus be automatically detected. However, especially when cables are used for the subscriber's connection, it will be more likely that if the telephone line is open or short-circuited, this will be due to an accidental fault in the telephone equipment instead of being the premeditated result of an act of banditry. The circuit of FIG. 4 permits to distinguish between these two alternatives. Normally when conditions are as they should be at the protected premises, the alarm contact $k_1$ is open while the second alarm contact $k_2$ is closed. In such a case, the attenuator ATT is inserted between the oscillator OSC and the telephone line and this may cause sufficient energy to reach the exchange and operate relay Ar thereat. Should an alarm condition arise, contact $k_1$ will close and contact $k_2$ will open to reach the position shown in which the attenuator ATT is no longer inserted in the circuit. Thus there will be an increase of signal at the exchange and this positive indication can be used to cause the release of supervisory alarm relay Ar thereat provided the receiving arrangement REC is designed to cause the operation of this relay only when the detected DC signal is within predetermined amplitude bounds on both sides. At least one additional detecting relay may be provided in association with the receiver REC to distinguish the case of an increased amplitude alarm signal from a reduced or zero amplitude signal since both cause release of Ar. Thus, in this manner, an open-circuited or short-circuited telephone line can be distinguished from an alarm condition and this might be dealt with for instance by the telephone maintenance personnel, although of course the operation of this second relay could also lead to an alarm call distinct from the first. While the attenuator shown is of the unbalanced three-terminal type it may obviously be arranged as a balanced circuit. Of course, if an open-circuited or short-circuited cable need not be taken as an urgent alarm condition to be detected by constant supervision, the alarm system may be arranged so that no tone is normally sent by the oscillator OSC and it is also possible to arrange for Ar to be normally released when conditions are normal.

FIG. 5 represents modification of the arrangement at the telephone substation (FIG. 1) in order to signal alarm conditions not by changes in amplitude, but by varying the frequency of the signal. In this case, the alarm contacts $k_3$ and $k_4$ correspond to distinct alarm conditions in the protected premises and normally these contacts are in the positions shown so that the capacitance determining the frequency of the oscillator OSC, and now shown outside the corresponding block, is formed of capacitors $C_0$ and $C_1$ connected in parallel through changeover contact $k_3$ in the break position. Then the oscillator OSC emits a predetermined frequency which results in the operation of supervisory alarm relay Ar (FIG. 1) at the exchange. If either $k_3$ or $k_4$ is actuated the tuning capacitance will be modified so as to change the frequency of the oscillator. In either case, relay Ar will release and the receiver REC may be arranged to lead to the operation of another relay corresponding to the new frequency transmitted. When $k_3$ alone is displaced, the frequency will be determined by $C_0$ alone. When $k_4$ is operated, the frequency will be set by all three capacitors $C_0$, $C_1$ and $C_2$ in parallel. It it is desired f.i. to have a value for the normal frequency, determined by $C_0$ and $C_1$ in parallel, which is the geometric mean of the higher and lower alarm frequency values the capacitor values should satisfy the relation $C_0C_2=C_1(C_0+C_1)$. In this manner, two different kinds of alarms may be given leading for instance in one case to the automatic dialling of No. 900 for the fire brigade and in the second case to the automatic dialling of No. 906 for the police in case of a burglary or a holdup. To this end, the relays detecting such distinct conditions in the line circuit adapter could readily give a corresponding signal for instance via an additional wiper of the alarm finder AF to the alarm sender circuit AS. As shown in FIG. 5, the alarm corresponding to $k_4$ has priority over that corresponding to $k_3$ the position of changeover contact $k_4$ being immaterial once make contact $k_4$ is closed. Other means of supervisory signalling might of course be conceived and f.i. distinct oscillators or oscillators emitting more than one frequency simultaneously might be considered. Impulse signalling is another possibility so that one alarm condition would correspond to a certain number of interruptions of the normal supervisory frequency signal while another or more distinct alarm condition(s) would correspond to different number(s) of such interruptions. In each case where more than one distinct alarm condition is envisaged, the receiver arrangement REC will have to be adapted to such conditions.

FIG. 6 shows by way of illustration for the schemes described in relation to FIGS. 4 and 5 a receiver REC with two output relays A*ar* and A*br* corresponding to distinct alarm conditions. These will be communicated to the alarm sender AS by means of distinct DC potentials provided with the help of the potentiometer comprising series resistors RA and RB in series between negative battery and ground. As shown, if alarm relay A*ar* operates, make contact *aa* applies ground to terminal *n* connected in the arc of a corresponding wiper of alarm finder AS. On the other hand, if it is alarm relay A*br* which positively detects a second alarm condition, its make contact *ab* connected to the junction of the two resistances will apply a different marking potential to this terminal *m*. Receiver REC may be provided with differently tuned detectors or alternatively with a single one which would detect a change from normal conditions (A*r*), trigger the alarm operations and have its tuning successively modified (A*ar*, A*br*) until the receiver relay would again operate, the switching actions having led to this reoperation indicating the nature of the alarm. Thus, the alarm sender circuit AS provided with repertory dialling facilities may be arranged to call various stations depending on the nature of the alarm and its origin. The system could of course also be used for normal repertory calls (abbreviated dialling). If the numbers to be called are predetermined in function of the type of call and independent of the origin thereof, it is clear however that the automatic repertory dialling facilities need only be controlled by the type of signal received without any translation operation function of the origin of the call, e.g. in case of Nos. 900 and 906 one must simply set the third train of dial pulses to ten or six depending on the type of alarm.

Nevertheless, if the alarm sender circuits serve subscribers in a particular area, for instance in connection with police calls, the alarm call might be directed to a particular number, e.g. a patrol car number via a radio telephone network, associated with this area.

Preferably, the oscillators at the subscribers' stations should be provided with a separate feeding battery. Acadmium battery may for instance be used in connection with an automatic charging scheme from the telephone exchange, such arrangements being already known in connection with other systems. Separate batteries for the alarm subscribers will avoid a general false alarm which would occur with mains failure using the scheme of FIG. 1 and oscillators powered from the mains.

Although alarm sender circuits have been represented as associated with a single finder, it will be clear that, in accordance with the number of alarm subscribers in an exchange and the alarm traffic, any suitable alarm switching scheme involving more than one switching stage may be considered.

While the principles of the invention have been described above in connection with specific apparatus, it is to be clearly understood that this description is made only by way of example and not as a limitation on the scope of the invention.

We claim:

1. In combination with a telephone system having a plurality of subscriber lines with corresponding subscriber stations, telephone subsets and telephone line circuits, and a central exchange with means providing communication paths to said subscriber lines, an automatic alarm signal communication system comprising:

a. a plurality of alarm signal handling lines;
b. an alarm signal monitoring center;
c. receiving means coupled to said subscriber lines at the central exchange to receive alarm signals;
d. alarm signal generating means coupled to selected ones of said subscriber lines at the corresponding subscriber stations, and including tone generator means for generating an AC frequency alarm signal the frequency of which is higher than that of the voice frequency band of said subscriber lines and means for applying said alarm signals to said subscriber lines and removing same upon detection of an alarm condition in order to alert said receiving means and make the system failure proof,
e. automatic selection signal generating means responsive to said receiving means for generating a signal identifying a predetermined one of said alarm signal handling lines in response to an alarm signal received from a subscriber line;
f. automatic identification means for identifying the subscriber line transmitting the alarm signal and for transmitting the alarm signal to said monitoring center over said predetermined one of said alarm signal handling lines;
g. filter means associated with each subscriber line capable of alarm signal generation, including a first filter connected between said alarm signal generating means and the associated telephone subset and a second filter connected between said alarm signal receiving means and the associated telephone line circuit, each of said first and second filters respectively adapted to prevent said AC signals from being transmitted to and from said telephone subset and said line circuit for enabling the establishment of a talking path to and from said subscriber station without interfering with the transmission of said alarm signals; and
h. switching means provided between said automatic selection signal generating means and the line circuits of said subscriber lines.

2. The automatic signal transmission system in accordance with claim 1 further including alarm line circuit means coupled to said automatic selection signal generating means for preventing an incoming telephone call from said subscriber line from inhibiting transmittal of said AC alarm signal over said alarm signal handling lines.

3. The automatic signal transmission system in accordance with claim 2, wherein said central exchange includes a unidirectional switching network coupled to selected ones of said alarm signal handling lines and said alarm line circuits are coupled to said switching network.

4. The automatic signal transmission system in accordance with claim 1, including an automatic tone generator, means interposed between said second filter and said line circuit and responsive to the operation of said alarm signal receiving means for disconnecting said filter from said subscriber line and connecting said automatic tone generator to said line circuit for sending any prerecorded or predetermined message to said alarm signal monitoring center.

5. The automatic signal transmission system in accordance with claim 4, in which said line circuit includes means for preventing an incoming telephone call from a subscriber line from inhibiting an alarm call.

6. The automatic signal transmission system in accordance with claim 5 wherein said central exchange is adapted to handle telephone calls unidirectionally and means responsive to the operation of the alarm signal receiving means for disconnecting said line circuit from an incoming telephone call and connecting said line circuit to said alarm signal handling line.

7. The automatic signal transmission system in accordance with claim 4, further including means for reestablishing said line circuit to a corresponding subscriber line station without waiting for the disappearance of said alarm signal but after said automatic selection signal generating means sends said alarm signal over said alarm signal handling line.

8. The automatic signal transmission system in accordance with claim 4, including means for releasing said automatic selection signal generating means immediately after sending an alarm line identifying signal.

9. The automatic signal transmission system in accordance with claim 8, wherein a predetermined subscriber line initiates said alarm signal, including means generating an acknowledgement signal from said alarm signal handling line that the subscriber station identity of said alarm signal initiating subscriber line has been received, and means for renewing operation of said automatic selection signal generating means upon failure to receive said acknowledgement signal.

10. The automatic signal transmission system in accordance with claim 9, including means applying an a.c. frequency signal, as said acknowledgement signal, which is the same as said AC alarm signal.

11. The automatic signal transmission system in accordance with claim 1, wherein said alarm signal generating means further includes means enabling said generating means to generate a plurality of different types of alarm signals, said receiving means further includes means for discriminating the types of alarm signals; and said automatic selection signal generating means includes means for generating a signal identifying an alarm signal handling line corresponding to the type of alarm signal being generated by said alarm signal generating means.

12. The automatic signal transmission system in accordance with claim 11, wherein said alarm signal generating means includes capacitive networks for generating a plurality of tone signals of different frequencies above 20,000 Hertz.

13. The automatic signal transmission system in accordance with claim 11, wherein said alarm signal generating means includes an attenuation network connected between said generating means and said subscriber line and means for shorting out and bypassing said attenuating network to generate said alarm signal in the presence of an alarm condition.

14. The automatic signal transmission system in accordance with claim 13 wherein said receiving means further includes means arranged to detect changes in the signal amplitude level from said generating means.